US012335777B2

(12) United States Patent
Deng et al.

(10) Patent No.: US 12,335,777 B2
(45) Date of Patent: Jun. 17, 2025

(54) VOICE COMMUNICATION METHOD AND SYSTEM UNDER A BROADBAND AND NARROW-BAND INTERCOMMUNICATION ENVIRONMENT

(71) Applicant: HYTERA COMMUNICATIONS CORPORATION LIMITED, Guangdong (CN)

(72) Inventors: Dejun Deng, Guangdong (CN); Heshan Yang, Guangdong (CN); Ni Huang, Guangdong (CN)

(73) Assignee: HYTERA COMMUNICATIONS CORPORATION LIMITED, Guangdong (CN)

( * ) Notice: Subject to any disclaimer, the term of this patent is extended or adjusted under 35 U.S.C. 154(b) by 363 days.

(21) Appl. No.: 17/735,249

(22) Filed: May 3, 2022

(65) Prior Publication Data

US 2023/0118085 A1    Apr. 20, 2023

Related U.S. Application Data

(63) Continuation of application No. PCT/CN2019/115655, filed on Nov. 5, 2019.

(51) Int. Cl.
*H04W 28/00* (2009.01)
*G10L 21/0316* (2013.01)
(Continued)

(52) U.S. Cl.
CPC ......... *H04W 28/06* (2013.01); *G10L 21/0316* (2013.01); *H04W 4/08* (2013.01); *H04W 84/08* (2013.01)

(58) Field of Classification Search
None
See application file for complete search history.

(56) References Cited

U.S. PATENT DOCUMENTS 10,594,744 B2 *  3/2020  Hori ................. H04L 65/80
2008/0069060 A1    3/2008  Das et al.
(Continued)

FOREIGN PATENT DOCUMENTS

CN    103581841 A    2/2014
CN    105872999 A    8/2016
(Continued)

OTHER PUBLICATIONS

China Intellectual Property Office (ISR/CN), "International Search Report for PCT/CN2019/115655", China, Jul. 27, 2020.
(Continued)

*Primary Examiner* — Brandon M Renner
(74) *Attorney, Agent, or Firm* — troutman pepper locke; Tim Tingkang Xia, Esq.

(57) ABSTRACT

Provided are a voice communication method and system under a broadband and narrow-band intercommunication environment. The method comprises: when a broadband terminal calls a narrow-band terminal, the broadband terminal executing a reducing operation on an energy amplitude of voice data to obtain a reduced voice data packet, and sending the reduced voice data packet to the narrow-band terminal such that the narrow-band terminal plays the reduced voice data packet; and when the narrow-band terminal calls the broadband terminal, the broadband terminal receiving a voice data packet, and executing an amplification operation on an energy amplitude of the voice data packet to obtain an enlarged voice data packet, and the broadband terminal playing the enlarged voice data packet. The present application can solve the problem of voice size inconsistency between a broadband terminal and a narrow-band terminal, thereby enhancing the usage experience for a user.

12 Claims, 5 Drawing Sheets

(51) Int. Cl.
*H04W 4/08* (2009.01)
*H04W 28/06* (2009.01)
*H04W 84/08* (2009.01)

(56) References Cited

U.S. PATENT DOCUMENTS

| | | |
|---|---|---|
| 2010/0241435 A1 | 9/2010 | Aoyagi et al. |
| 2014/0211965 A1* | 7/2014 | Hetherington ...... G10L 21/0208 |
| | | 381/94.2 |
| 2015/0162008 A1* | 6/2015 | Villette ................. G10L 21/038 |
| | | 704/500 |
| 2018/0027027 A1* | 1/2018 | Leung ................. H04L 65/1104 |
| 2018/0139252 A1* | 5/2018 | Wang ....................... H04N 7/15 |
| 2024/0153520 A1* | 5/2024 | Solomon ............... G10L 15/063 |

FOREIGN PATENT DOCUMENTS

| | | |
|---|---|---|
| CN | 106331380 A | 1/2017 |
| CN | 205864751 U | 1/2017 |
| CN | 109428854 A | 3/2019 |

OTHER PUBLICATIONS

SIPO, "1st CN Office Action and Search Report for CN Application No. 201911071413.8", China.
EPO, "Supplementary European Search Report for EP Application No. 19951257.5", Hague.

* cited by examiner

VOICE COMMUNICATION METHOD AND SYSTEM UNDER A BROADBAND AND NARROW-BAND INTERCOMMUNICATION ENVIRONMENT

CROSS-REFERENCE TO RELATED APPLICATION

This application is a continuation application of International Patent Application No. PCT/CN2019/115655, filed Nov. 1, 2019, which is hereby incorporated herein in its entirety by reference.

TECHNICAL FIELD

The present application relates generally to the field of communications, and more particularly to a voice communication method and system under a broadband and narrowband intercommunication environment.

BACKGROUND

A broadband terminal refers to a handheld terminal communicating by $3^{rd}$-Generation (3G), $4^{th}$-Generation (4G), Wireless Fidelity (WIFI), and other networks. A narrowband terminal refers to a handheld terminal communicating by Police Digital Trunking (PDT), Digital Mobile Radio (DMR), Terrestrial Trunked Radio (TETRA), etc.

At present, a broadband terminal may perform voice communication with a narrowband terminal. However, due to different voice structures of the broadband terminal and the narrowband terminal, the voice sizes may be inconsistency during voice communication. That is, whistling may occur in the narrowband terminal side when the broadband terminal calls the narrowband terminal; while a voice played by the broadband terminal is relatively low in volume when the narrowband terminal calls the broadband terminal.

SUMMARY

In view of the foregoing, the present application provides a voice communication method under a broadband and narrowband intercommunication environment, which can solve the problem of voice size inconsistency between a broadband terminal and a narrowband terminal, thereby enhancing the user experience.

To this end, the following technical features are provided in the present application.

According to a first aspect of the present application, a voice communication method under a broadband and narrowband intercommunication environment is provided, which includes:
  when a broadband terminal calls a narrowband terminal, executing a reducing operation on an energy amplitude of voice data to obtain a reduced voice data packet, and sending the reduced voice data packet to the narrowband terminal for the narrowband terminal to play the reduced voice data packet, by the broadband terminal; and
  when the narrowband terminal calls the broadband terminal, receiving a voice data packet, executing an amplifying operation on an energy amplitude of the voice data packet to obtain an amplified voice data packet, and playing the amplified voice data packet, by the broadband terminal.

In a first embodiment of the method according to the first aspect as such, the call includes a group call or a single call.

When the call is a group call, the broadband terminal is further configured to collect voice data to generate a normal voice data packet, and send the normal voice data packet to other broadband terminals in the group call.

In a second embodiment of the method according to the first aspect as such, said executing the reducing operation on the energy amplitude of voice data to obtain the reduced voice data packet by the broadband terminal includes: collecting the voice data, executing a reducing process on the energy amplitude of the voice data, and sending voice data with a reduced energy amplitude to one coder, so that the coder adds a type field in a packet header, changes the type field in the packet header into a first numerical value, and generates the reduced voice data packet based on the packet header and the voice data.

Said collecting the voice data to generate the normal voice data packet by the broadband terminal includes: collecting the voice data, sending the voice data to another coder, adding a type field in a packet header, changing the type field in the packet header into a second numerical value, and generating the normal voice data packet based on the packet header and the voice data.

According to a second aspect of the present application, a voice communication method under a broadband and narrowband intercommunication environment is provided, the method is applied to a voice communication system under a broadband and narrowband intercommunication environment, and the system includes: a broadband terminal, a broadband system, a narrowband terminal, a narrowband system, and an internet protocol (IP) multimedia subsystem (IMS). The method includes:

When the broadband terminal calls the narrowband terminal, the broadband terminal executes a reducing operation on an energy amplitude of voice data to obtain a reduced voice data packet, and after processing sequentially by the broadband system, the IMS, and the narrowband system, sends the reduced voice data packet to the narrowband terminal such that the narrowband terminal plays the reduced voice data packet.

When the narrowband terminal calls the broadband terminal, the broadband terminal receives a voice data packet after processing sequentially by the narrowband system, the IMS, and the broadband system, executes an amplifying operation on an energy amplitude of the voice data packet to obtain an amplified voice data packet, and plays the amplified voice data packet.

In a first embodiment of the method according to the second aspect as such, the call includes a group call or a single call.

When the call is a group call, the broadband terminal is further configured to collect voice data to generate a normal voice data packet, and send the normal voice data packet to other broadband terminals in the group call.

In a second embodiment of the method according to the second aspect as such, said executing, by the broadband terminal, the reducing operation on the energy amplitude of voice data to obtain the reduced voice data packet includes: collecting the voice data, executing a reducing process on the energy amplitude of the voice data, and sending voice data with a reduced energy amplitude to one coder, so that the coder adds a type field in a packet header, changes the type field in the packet header into a first numerical value, and generates the reduced voice data packet based on the packet header and the voice data.

According to a third aspect of the present application, a voice communication method under a broadband and narrowband intercommunication environment is provided, the method is applied to a voice communication system under a broadband and narrowband intercommunication environment, and the method includes:

sending, by a broadband terminal, a call message to a Trunking Control Function (TCF) module in an IMS, the call message including a group call type and a terminal group identifier in case of a group call;

generating and sending, by the TCF module, a feedback message to the broadband terminal after determining a terminal group type based on the terminal group identifier, where when the terminal group type is a mixed group including both a broadband terminal and a narrowband terminal, the feedback message contains an indication parameter indicating the mixed group;

receiving and recognizing, by the broadband terminal, the feedback message, constructing two paths of voice data packets when the feedback message contains the indication parameter, and sending the two paths of voice data packets alternately to a Trunking Media Function (TMF) module in the IMS, one path of voice data packet being a reduced voice data packet with a reduced energy amplitude, while the other path of voice data packet being a normal voice data packet with a normal energy amplitude; and recognizing, by the TMF module, the two paths of voice data packets, distributing the reduced voice data packet to a narrowband terminal in the terminal group, and distributing the normal voice data packet to other broadband terminals in the terminal group.

In a first embodiment of the method according to the third aspect as such, the constructing two paths of voice data packets includes:

collecting, by the broadband terminal, voice data, and enabling two coders;

executing a reducing process on an energy amplitude of the voice data, sending voice data with a reduced energy amplitude to one path of coder, adding a type field in a packet header, changing the type field in the packet header into a first numerical value, and generating the reduced voice data packet based on the packet header and the voice data; and sending the voice data to the other path of coder, adding a type field in a packet header, changing the type field in the packet header into a second numerical value, and generating the normal voice data packet based on the packet header and the voice data.

In a second embodiment of the method according to the third aspect as such, the recognizing, by the TMF module, the two paths of voice data packets and distributing the reduced voice data packet to a narrowband terminal in the terminal group includes:

recognizing, by the TMF module, the packet headers of the two paths of voice data packets;

deleting, if the type field in the packet header of one path of voice data packet is the first numerical value, the type field in the packet header of the voice data packet, and then distributing the voice data packet to a narrowband system; and after recognizing the voice data packet to obtain the voice data, sending, by the narrowband system, the voice data to the narrowband terminal in the terminal group.

In a third embodiment of the method according to the third aspect as such, after the distributing the normal voice data packet to other broadband terminals in the terminal group, the method further includes:

receiving and recognizing, by the other broadband terminals, the normal voice data packet; and confirming, after recognizing that the type field in the packet header of the normal voice data packet is the second numerical value, that the voice data packet is sent by the broadband terminal, and directly playing the normal voice data packet.

According to a fourth aspect of the present application, a voice communication method under a broadband and narrowband intercommunication environment is provided, the method is applied to a voice communication system under a broadband and narrowband intercommunication environment, and the method includes:

sending, by a narrowband terminal, a call message to a TCF module in an IMS, the call message including a group call type and a terminal group identifier in case of a group call;

generating and sending, by the TCF module, a feedback message to the narrowband terminal after determining a terminal group type based on the terminal group identifier, where when the terminal group type is a mixed group including both a broadband terminal and a narrowband terminal, the feedback message contains an indication parameter indicating the mixed group;

receiving and recognizing, by the narrowband terminal, the feedback message, and when the feedback message contains the indication parameter, sending voice data to a narrowband system such that the narrowband system generates a voice data packet and sends, through a gateway, the voice data packet to a TMF module in the IMS;

adding, by the TMF module, a type field in a packet header of the voice data packet, changing the type field in the packet header into a first numerical value, and distributing the voice data packet to a broadband terminal and other narrowband terminals in the terminal group; and receiving and recognizing, by the broadband terminal in the terminal group, the voice data packet, confirming that the voice data packet is sent by the narrowband terminal if the type field in the packet header of the voice data packet is the first numerical value, executing an amplifying operation on an energy amplitude of the voice data packet to obtain an amplified voice data packet, and playing the amplified voice data packet.

In a first embodiment of the method according to the fourth aspect as such, the distributing the voice data packet to a broadband terminal and other narrowband terminals in the terminal group includes:

recognizing, by the TMF module, the packet header of the voice data packet; and deleting, if the type field in the packet header of the voice data packet is the first numerical value, the type field in the packet header of the voice data packet, and then distributing the voice data packet to the narrowband system.

According to a fifth aspect of the present application, a voice communication method under a broadband and narrowband intercommunication environment is provided, the method is applied to a voice communication system under a broadband and narrowband intercommunication environment, and the method includes:

sending, by a broadband terminal, a call message to a TCF module in an IMS, the call message including a single call type and a terminal identifier in case of a single call;

generating and sending, by the TCF module, a feedback message to the broadband terminal after determining a terminal type based on the terminal identifier, the feedback message containing an indication parameter indicating a narrowband terminal when the terminal type is narrowband terminal;

receiving and recognizing, by the broadband terminal, the feedback message of the TCF module, constructing one path of reduced voice data packet with a reduced energy amplitude when the feedback message contains the indication parameter, and sending the reduced voice data packet to a TMF module in the IMS; and recognizing, by the TMF module, the reduced voice data packet, and sending the reduced voice data packet to the narrowband terminal corresponding to the terminal identifier.

According to a sixth aspect of the present application, a voice communication method under a broadband and narrowband intercommunication environment is provided, the method is applied to a voice communication system under a broadband and narrowband intercommunication environment, and the method includes:

sending, by a narrowband terminal, a call message to a TCF module in an IMS, the call message including a single call type and a terminal identifier in case of a single call;

generating and sending, by the TCF module, a feedback message to the narrowband terminal after determining a terminal type based on the terminal identifier, where when the terminal type is a broadband terminal, the feedback message contains an indication parameter indicating the broadband terminal;

receiving and recognizing, by the narrowband terminal, the feedback message, and when the feedback message contains the indication parameter, sending voice data to a narrowband system such that the narrowband system generates a voice data packet and sends, through a gateway, the voice data packet to a TMF module in the IMS;

adding, by the TMF module, a type field in a packet header of the voice data packet, changing the type field in the packet header into a first numerical value, and distributing the voice data packet to the broadband terminal corresponding to the terminal identifier; and receiving and recognizing, by the broadband terminal, the voice data packet, confirming that the voice data packet is sent by the narrowband terminal if the type field in the packet header of the voice data packet is the first numerical value, executing an amplifying operation on an energy amplitude of the voice data packet to obtain an amplified voice data packet, and playing the amplified voice data packet.

According to a seventh aspect of the present application, a terminal is provided, the terminal as a broadband terminal, and the broadband terminal includes:

a processor, and a memory storing instructions for execution by the processor, when executed, the instructions cause the broadband terminal to perform operations including:

when a broadband terminal calls a narrowband terminal, executing a reducing operation on an energy amplitude of voice data to obtain a reduced voice data packet, and sending the reduced voice data packet to the narrowband terminal for the narrowband terminal to play the reduced voice data packet, by the broadband terminal; and when the narrowband terminal calls the broadband terminal, receiving a voice data packet, executing an amplifying operation on an energy amplitude of the voice data packet to obtain an amplified voice data packet, and playing the amplified voice data packet, by the broadband terminal.

In a first embodiment of the terminal according to the seventh aspect as such, the call includes a group call or a single call.

When the call is a group call, the broadband terminal is further configured to collect voice data to generate a normal voice data packet, and send the normal voice data packet to other broadband terminals in the group call.

In a second embodiment of the terminal according to the seventh aspect as such, said executing the reducing operation on the energy amplitude of voice data to obtain the reduced voice data packet by the broadband terminal includes: collecting the voice data, executing a reducing process on the energy amplitude of the voice data, and sending voice data with a reduced energy amplitude to one coder, so that the coder adds a type field in a packet header, changes the type field in the packet header into a first numerical value, and generates the reduced voice data packet based on the packet header and the voice data.

Said collecting the voice data to generate the normal voice data packet by the broadband terminal includes: collecting the voice data, sending the voice data to another coder, adding a type field in a packet header, changing the type field in the packet header into a second numerical value, and generating the normal voice data packet based on the packet header and the voice data.

According to an eighth aspect of the present application, a voice communication system under a broadband and narrowband intercommunication environment is provided, which includes:

a broadband terminal, a broadband system, a narrowband terminal, a narrowband system, and Internet Protocol (IP) Multimedia Subsystem (IMS), when the broadband terminal calls the narrowband terminal, the broadband terminal executes a reducing operation on an energy amplitude of voice data to obtain a reduced voice data packet, and after processing sequentially by the broadband system, the Internet Protocol Multimedia Subsystem, and the narrowband system, sends the reduced voice data packet to the narrowband terminal for the narrowband terminal to play the reduced voice data packet; and when the narrowband terminal calls the broadband terminal, the broadband terminal receives a voice data packet after processing sequentially by the narrowband system, the IMS, and the broadband system, executes an amplifying operation on an energy amplitude of the voice data packet to obtain an amplified voice data packet, and plays the amplified voice data packet.

In a first embodiment of the system according to the eighth aspect as such, the call includes a group call or a single call, when the call is the group call, the broadband terminal collects the voice data to generate a normal voice data packet, and after processing sequentially by the broadband system, the Internet Protocol Multimedia Subsystem, sends the normal voice data packet to other broadband terminals in the group call.

In a second embodiment of the system according to the eighth aspect as such, said executing the reducing operation on the energy amplitude of the voice data to obtain the reduced voice data packet by the broadband terminal includes: collecting the voice data, executing a reducing process on the energy amplitude of the voice data, and sending the voice data with the reduced energy amplitude to one coder, so that the coder adds a type field in a packet header, changes the type field in the packet header into a first numerical value, and generates the reduced voice data packet based on the packet header and the voice data; and said collecting the voice data to generate the normal voice data packet by the broadband terminal includes: collecting the voice data, sending the voice data to another coder, adding a type field in a packet header, changing the type field in the packet header into a second numerical value, and generating the normal voice data packet based on the packet header and the voice data.

The following beneficial effects may be achieved by the above technical means.

In order to solve the problem of whistling occurring in a narrowband terminal when a broadband terminal calls the narrowband terminal, the broadband terminal executes a reducing operation on an energy amplitude of a voice data packet, and sends a reduced voice data packet to a narrowband terminal such that the narrowband terminal plays the reduced voice data packet. As such, whistling at the narrowband terminal is avoided.

In order to solve the problem of relatively low volume of a voice played by a broadband terminal when a narrowband terminal calls the broadband terminal, a narrowband terminal still sends a voice data packet normally, and a broadband terminal executes an amplifying operation on an energy amplitude of the voice data packet, and plays an amplified voice data packet. As such, the problem of relatively low volume of a voice played by the broadband terminal is solved.

BRIEF DESCRIPTION OF THE DRAWINGS

To describe the technical solutions in embodiments of the present application or in the existing technology more clearly, the following briefly describes the accompanying drawings required for describing the embodiments or the existing technology. Apparently, the accompanying drawings in the following description show merely some embodiments of the present application, and a person of ordinary skill in the art may derive other drawings from the accompanying drawings without creative efforts.

DETAILED DESCRIPTION

Definitions of Terms

IMS: IP Multimedia Subsystem.
TMF: Trunking Media Function.
TCF: Trunking Control Function.
PDTGW: Police Digital TrunkingGateWay.
RTP: Real-Time Transport Protocol.

The present application provides a voice communication method under a broadband and narrowband intercommunication environment, which can solve the problem of the voice size inconsistency between a broadband terminal and a narrowband terminal during intercommunication, thereby enhancing the user experience.

In order to solve the problem of whistling occurring in a narrowband terminal when a broadband terminal calls the narrowband terminal, when the broadband terminal calls the narrowband terminal, the broadband terminal executes a reducing operation on an energy amplitude of voice data to obtain a reduced voice data packet, and sends the reduced voice data packet to the narrowband terminal, so that the narrowband terminal can play the reduced voice data packet, so as to prevent the narrowband terminal from whistling.

In order to solve the problem of relatively low volume of a voice played by a broadband terminal when a narrowband terminal calls the broadband terminal, when the narrowband terminal calls the broadband terminal, the broadband terminal receives a voice data packet, executes an amplifying operation on an energy amplitude of the voice data packet to obtain an amplified voice data packet, and plays the amplified voice data packet, thereby solving the problem of relatively low volume of the voice played by the broadband terminal.

All voice data packets in the present application are RTP packets, i.e., Real-Time Transport Protocol data packets.

The technical solutions in the embodiments of the present application are clearly and completely described in the following with reference to the accompanying drawings in the embodiments of the present invention. Apparently, the described embodiments are merely some rather than all of the embodiments of the present invention. All other embodiments obtained by a person of ordinary skill in the art based on the embodiments of the present application without creative efforts shall fall within the protection scope of the present application.

Figure 1:
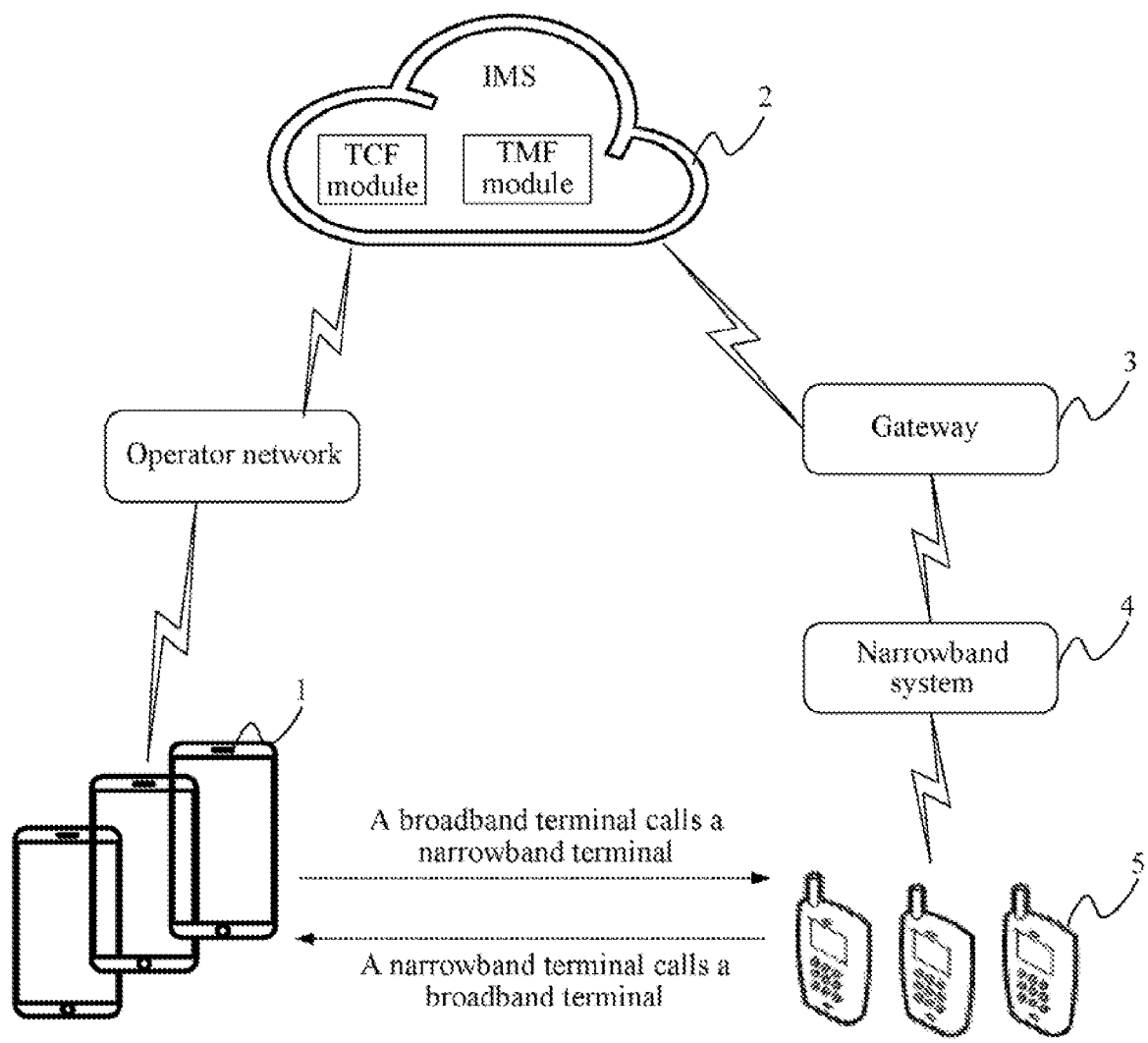
FIG. 1 is a schematic structural diagram of a voice communication system under a broadband and narrowband intercommunication environment according to one embodiment of the present application.

Referring to FIG. 1, the present application provides a voice communication system under a broadband and narrowband intercommunication environment, specifically including:

at least one broadband terminal 1, an IP Multimedia Subsystem (IMS) 2, a Police Digital TrunkingGateWay (i.e., PDTGW) 3, a narrowband system 4, and at least one narrowband terminal 5.

The IMS 2 includes a Trunking Control Function module (i.e., TCF module) and a Trunking Media Function module (i.e., TMF module).

The at least one broadband terminal 1 is connected with the IMS 2 through an operator network.

The at least one narrowband terminal 5 is connected with the narrowband system 4. The narrowband system 4 is connected with the IMS 2 through the PDTGW 3.

In the voice communication system under the broadband and narrowband intercommunication environment, both the narrowband terminal and the broadband terminal can initiate calls. The call may be in two forms: a group call or a single call.

In some application scenarios, the broadband terminal or the narrowband terminal needs to call another narrowband terminal or broadband terminal. This is a single call.

In some application scenarios, a plurality of terminals may form a group, and a narrowband terminal or broadband terminal in the group may call all the other terminals in the group. This is a group call.

In embodiments of the present application, no voice size inconsistency occurs when a broadband terminal calls a narrowband terminal or when a narrowband terminal calls a broadband terminal. Therefore, the present application focuses on voice intercommunication between a narrowband terminal and a broadband terminal.

In order solve the problem of the voice size inconsistency between a broadband terminal and a narrowband terminal during voice intercommunication, the present application mainly aims to improve a call processing process of a broadband terminal (there are also some changes related to an IP multimedia subsystem (IMS), which will be described in detail later), and no changes are made to a call processing process of a narrowband terminal.

In order to solve the problem of whistling occurring in a narrowband terminal when a broadband terminal calls the narrowband terminal, when the broadband terminal calls the narrowband terminal, the broadband terminal executes a reducing operation on an energy amplitude of voice data to obtain a reduced voice data packet, and sends the reduced voice data packet to the narrowband terminal so that the narrowband terminal can play the reduced voice data packet. As such, whistling at the narrowband terminal is avoided.

In order to solve the problem of relatively low volume of a voice played by a broadband terminal when a narrowband terminal calls the broadband terminal, when the narrowband terminal calls the broadband terminal, the broadband terminal receives a voice data packet, executes an amplifying operation on an energy amplitude of the voice data packet to obtain an amplified voice data packet, and plays the amplified voice data packet. As such, the problem of relatively low volume of a voice played by the broadband terminal is solved.

Since processing processes of a broadband terminal for a group call and a single call are different, a processing process for a group call and a processing process for a single call are described respectively in the present application.

First, the processing process for a group call is introduced. The processing process for a group call is divided into two embodiments according to different call initiators. Descriptions are made in embodiment 1 taking a broadband terminal as a group call initiator. Descriptions are made in embodiment 2 taking a narrowband terminal as a group call initiator.

Figure 2:
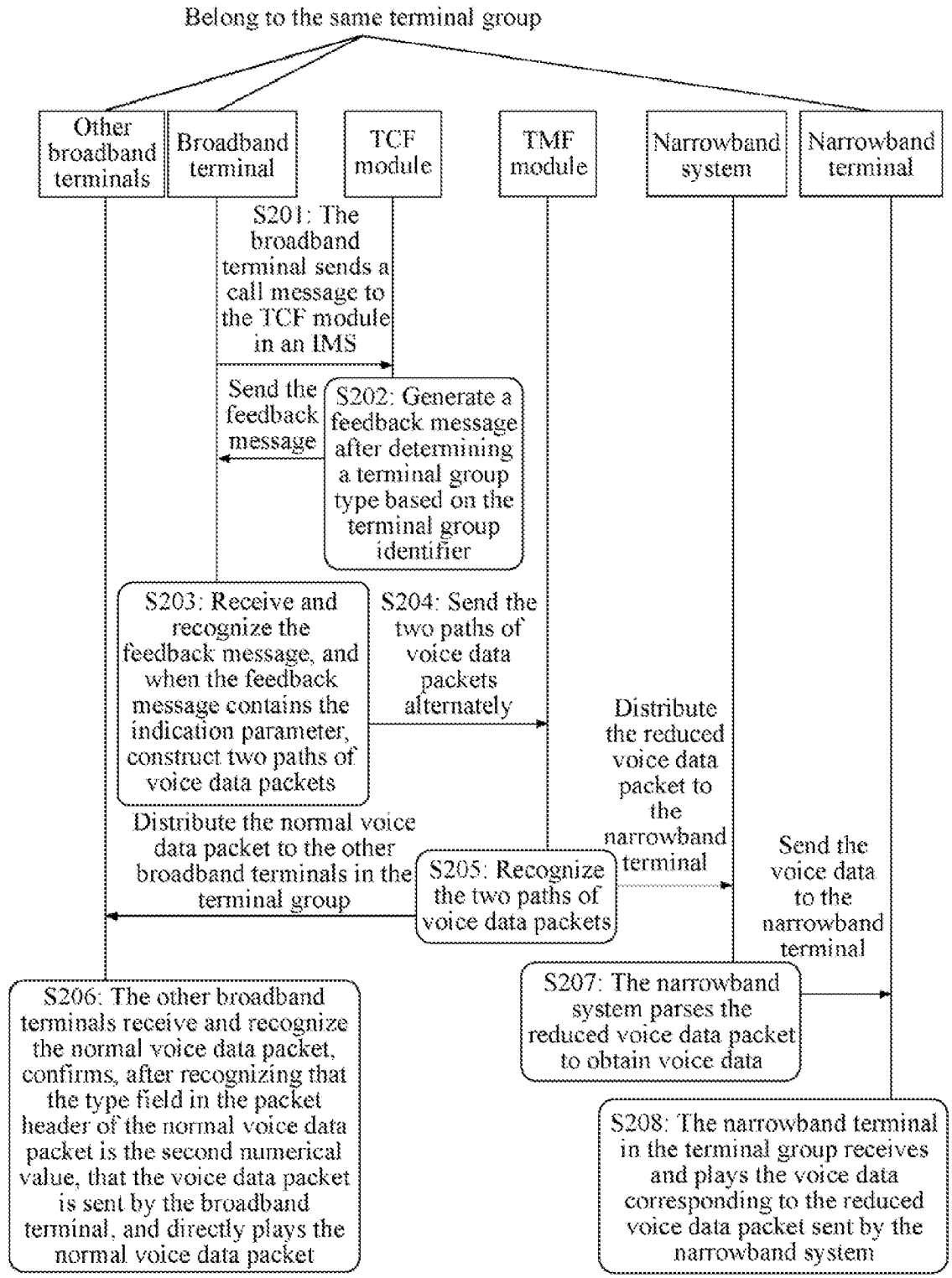
FIG. 2 is a schematic structural diagram of embodiment 1 of a voice communication method under a broadband and narrowband intercommunication environment according to one embodiment of the present application.

Referring to FIG. 2, embodiment 1 of the voice communication method under a broadband and narrowband intercommunication environment is illustrated, which may include the following steps.

In step S201, a broadband terminal sends a call message to a TCF module in an IMS, the call message including a group call type and a terminal group identifier in case of a group call.

The broadband terminal has established a communication link with the IMS in advance. The broadband terminal may send a call message to the TCF module in the IMS when needing to initiate a group call.

The call message includes a group call type and a terminal group identifier. The group call type may notify the TCF module that the current call is a group call. The terminal group identifier may notify the TCF module that the current group call is made within a terminal group corresponding to the terminal group identifier.

In step S202, the TCF module generates and sends a feedback message to the broadband terminal after determining the terminal group type based on the terminal group identifier, where when the terminal group type is a mixed group including both broadband terminals and narrowband terminals, the feedback message contains an indication parameter indicating the mixed group.

There are two types of terminal groups: a mixed type and a pure broadband type. A terminal group of the mixed type is a terminal group including both narrowband terminals and broadband terminals. A terminal group of the pure broadband type is a terminal group including broadband terminals only. The terminal group temporarily does not include the pure narrowband type. The pure narrowband type is processed by another communication system, and thus is temporarily not considered in the present application.

The TCF module pre-stores each terminal group type, and determines the terminal group type to which the terminal belongs based on the terminal group identifier.

When the terminal group type is the pure broadband type, the TCF module generates a feedback message, the feedback message indicates that the terminal group type is the pure broadband type.

When the terminal group type is the mixed type, the TCF module generates a feedback message, the feedback message indicates that the terminal group type is the mixed type. For example, a pdtcall parameter is added in the feedback message to indicate that the terminal group type is the mixed type.

In step S203, the broadband terminal receives and recognizes the feedback message, and constructs two paths of the voice data packet when the feedback message contains the indication parameter. Among them, one path of the voice data packet is a reduced voice data packet with a reduced energy amplitude, and the other path of the voice data packet is a normal voice data packet with a normal energy amplitude.

The broadband terminal receives and recognizes the feedback message sent by the TCF module. If the feedback message does not contain the indication parameter (i.e., a parameter indicating that the terminal group is the mixed type, still using the pdtcall parameter in the above example), it is confirmed that the terminal group type is the pure broadband type. In such case, a process subsequently executed by the broadband terminal is the same as a process for a group call in the conventional art, and will not be elaborated herein.

If the feedback message contains the indication parameter (i.e., a parameter indicating that the terminal group is the mixed type, still using the pdtcall parameter in the above example), it is confirmed that the terminal group type is the mixed type. In order to ensure that other broadband terminals in the group call play a voice data packet normally and avoid whistling at a narrowband terminal, the broadband terminal constructs two paths of the voice data packet.

One path of voice data packet is a reduced voice data packet with a reduced energy amplitude, and is used to be sent to the narrowband terminal in the terminal group. The other path of the voice data packet is a normal voice data packet with a normal energy amplitude, and is used to be sent to the other broadband terminals in the terminal group.

In order to construct two paths of the voice data packet, the broadband terminal collects voice data, and enables two coders.

A reducing process is executed on an energy amplitude of the voice data, voice data with a reduced energy amplitude is sent to one coder, a type field is added in a packet header, the type field in the packet header is changed into a first numerical value, and the reduced voice data packet is generated based on the packet header and the voice data.

The voice data is sent to the other coder, a type field is added in a packet header, the type field in the packet header is changed into a second numerical value, and the normal voice data packet is generated based on the packet header and the voice data.

It can be understood that a reducing factor determined by multiple tests is pre-stored in the broadband terminal, and the broadband terminal may execute a reducing operation on the energy amplitude according to the reducing factor. Under normal circumstances, the normal energy amplitude approximately ranges from 14,000 to −24,000, and the reduced energy amplitude approximately ranges from 2,000 to −3,000.

A purpose of adding in the packet headers and changing the type fields into different numerical values is to recognize where the two paths of voice data packets are to be sent based on the type field. The first numerical value represents that the reduced voice data packet is to be sent to narrowband terminals. The second numerical value represents that the normal voice data packet is to be sent to broadband terminals.

For example, the type field is added in the packet header, and both the TMF module and the terminal determine whether the voice data packet is to be sent to the broadband terminals or the narrowband terminals according to the type field. If the type field is 0, it indicates that the voice data packet is to be forwarded to both the broadband terminals and the narrowband terminals. If the type field is 1, it indicates that the voice data packet is to be sent to the narrowband terminals. If the type field is 2, it indicates that the voice data packet is to be sent to the broadband terminals.

In order to conveniently distinguish the two paths of voice data packets by the device, a synchronization source flag bit SSRC may be used for distinguishing. Synchronization source flag bits SSRC in the two paths of voice data packets are different data values. For example, an SSRC value of the first path is a randomly generated data value, and an SSRC value of the other path is the SSRC value of the first path plus one.

In step S204, the broadband terminal sends the two paths of voice data packets alternately to a TMF module in the IMS.

The TMF module in the IMS provides a port for the broadband terminal. The broadband terminal may send the two paths of voice data packets alternately to one port of the TMF module such that the TMF module receives the two paths of voice data packets. As such, occupied network resources of the TMF module are reduced.

In step S205, the TMF module recognizes the two paths of voice data packets, distributes the reduced voice data packet to a narrowband system in the terminal group, and distributes the normal voice data packet to the other broadband terminals in the terminal group.

The TMF module recognizes the type fields in the packet headers of the two paths of voice data packets. If the type field in the packet header of one path of voice data packet is the first numerical value, the type field in the packet header of the voice data packet is deleted, and then the voice data packet is distributed to the narrowband system.

In order to avoid influences on the narrowband system, the voice data packet is sent to the narrowband system through a PDTGW after the type field in the packet header is deleted. If the type field in the packet header of one path of voice data packet is the second numerical value, the voice data packet is sent to the other broadband terminals in the terminal group through an operator system.

In step S206, the other broadband terminals receive and recognize the normal voice data packet, and confirm, after recognizing that the type field in the packet header of the normal voice data packet is the second numerical value, that the voice data packet is sent by the broadband terminal, and directly play the normal voice data packet.

In a group call process, a broadband terminal may receive a voice data packet sent by a broadband terminal, or a voice data packet sent by a narrowband terminal. Therefore, the broadband terminal, after receiving a voice data packet, needs to recognize a type field in a packet header.

After it is recognized that the type field in the packet header of the voice data packet is a second numerical value, it is confirmed that the voice data packet is a normal voice data packet sent by a broadband terminal. There is no voice inconsistency between broadband terminals, so that normal voice data packet is played directly.

In step S207, the narrowband system analyzes the reduced voice data packet to obtain voice data, and sends the voice data to a narrowband terminal.

The narrowband system, after analyzing the reduced voice data packet to obtain voice data, sends the voice data to the narrowband terminal in the terminal group.

The concept of RTP packet does not exist for a narrowband terminal, so the narrowband system may analyze the voice data packet to obtain the voice data, and send the voice data to the narrowband terminal in the terminal group.

In step S208, the narrowband terminal in the terminal group receives and plays the voice data corresponding to the reduced voice data packet sent by the narrowband system.

It can be seen from embodiment 1 that the present example has the following beneficial effects.

In order to solve the problem of whistling occurring in a narrowband terminal when a broadband terminal calls the narrowband terminal, when the broadband terminal calls the narrowband terminal, the broadband terminal executes a reducing operation on an energy amplitude of voice data to obtain a reduced voice data packet, and sends the reduced voice data packet to the narrowband terminal such that the narrowband terminal plays the reduced voice data packet. As such, whistling at the narrowband terminal is avoided.

Moreover, the broadband terminal sends two paths of voice data packets alternately to one port of the TMF module, which may reduce occupied network resources of the TMF module as compared with occupying two ports of the TMF module.

Figure 3:
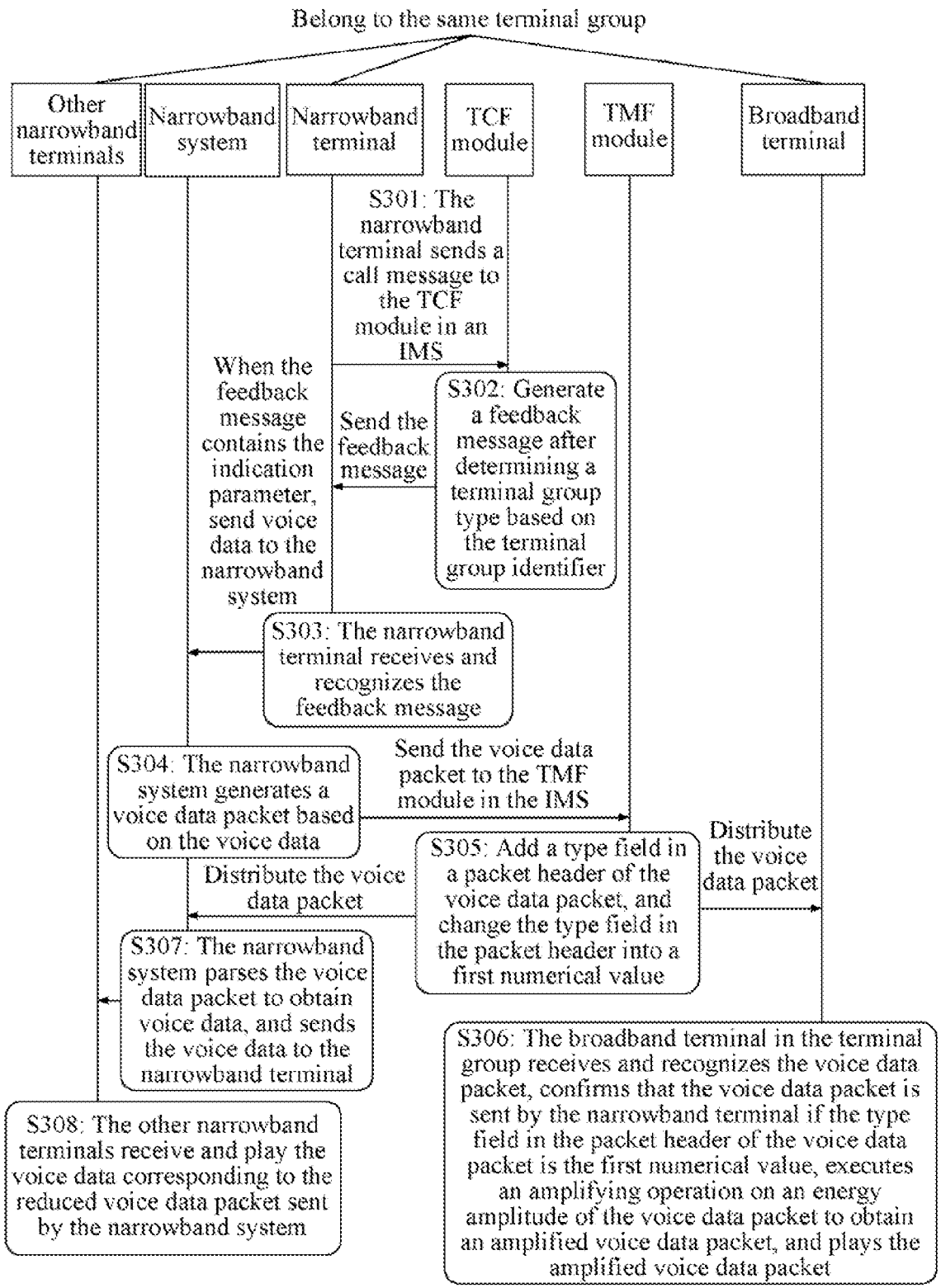
FIG. 3 is a schematic structural diagram of embodiment 2 of a voice communication method under a broadband and narrowband intercommunication environment according to one embodiment of the present application.

Referring to FIG. 3, embodiment 2 of a voice communication method under a broadband and narrowband intercommunication environment is illustrated, which may include the following steps.

In step S301, a narrowband terminal sends a call message to a TCF module in an IMS, the call message including a group call type and a terminal group identifier in case of a group call.

In step S302, the TCF module generates and sends a feedback message to the narrowband terminal after determining a terminal group type based on the terminal group identifier, where when the terminal group type is a mixed group including both broadband terminals and narrowband terminals, the feedback message contains an indication parameter indicating the mixed group.

Processes of steps S301 and S303 are similar to those of steps S201 and S202, and will not be elaborated herein.

In step S303, the narrowband terminal receives and recognizes the feedback message, and when the feedback message contains the indication parameter, sends voice data to a narrowband system.

In step S304, the narrowband system generates a voice data packet based on the voice data, and sends the voice data packet to a TMF module in the IMS.

In step S305, the TMF module adds a type field in a packet header of the voice data packet, changes the type field in the packet header into a first numerical value, and distributes the voice data packet to a broadband terminal in the terminal group and the narrowband system.

The voice data packet transmitted by the narrowband system through a gateway does not contain any type field. Therefore, for facilitating the processing of the TMF module, the TMF module, when recognizing that the voice data packet is transmitted from a narrowband port, adds a type field for the voice data packet, and changes the type field in a packet header into a first numerical value to indicate that the voice data packet is from the narrowband terminal.

The process that the TMF module distributes the voice data packet to a broadband terminal and other narrowband terminals in the terminal group includes the following operations. The TMF module recognizes the packet header of the voice data packet. If the type field in the packet header of the voice data packet is the first numerical value, the type field in the packet header of the voice data packet is deleted, and the voice data packet is distributed to the narrowband system. Details refer to the detailed explanations about step S205, and elaborations are omitted herein.

In step S306, the broadband terminal in the terminal group receives and recognizes the voice data packet, confirms that the voice data packet is sent by the narrowband terminal if the type field in the packet header of the voice data packet is the first numerical value, executes an amplifying operation on an energy amplitude of the voice data packet to obtain an amplified voice data packet, and plays the amplified voice data packet.

In order to solve the problem of relatively low volume if the voice data packet is played directly, the broadband terminal, after recognizing the voice data packet sent by the narrowband terminal, executes an amplifying operation on an energy amplitude of the voice data packet, and plays an amplified voice data packet. As such, the problem of relatively low volume at a broadband terminal side when a narrowband terminal calls a broadband terminal is solved.

It can be understood that an amplification factor determined by multiple tests is pre-stored in the broadband terminal, and the broadband terminal may execute the amplifying operation on the energy amplitude according to the amplification factor, thereby obtaining the amplified voice data packet.

In step S307, the narrowband system analyzes the voice data packet to obtain voice data, and sends the voice data to a narrowband terminal.

The narrowband system, after analyzing the reduced voice data packet to obtain voice data, sends the voice data to the narrowband terminal in the terminal group.

The concept of data packet does not exist for a narrowband terminal, so the narrowband system may analyze the voice data packet to obtain the voice data, and send the voice data to the narrowband terminal in the terminal group.

In step S308, the other narrowband terminals receive and play the voice data corresponding to the reduced voice data packet sent by the narrowband system.

It can be seen from the above steps that embodiment 2 has the following beneficial effects.

In order to solve the problem of relatively low volume of a voice played by a broadband terminal when a narrowband terminal calls the broadband terminal, when a narrowband terminal calls a broadband terminal, the broadband terminal receives a voice data packet, executes an amplifying operation on an energy amplitude of the voice data packet to obtain an amplified voice data packet, and plays the amplified voice data packet. As such, the problem of relatively low volume of a voice played by the broadband terminal is solved.

The processing process for a single call will be introduced below. The processing process for a single call is divided into two examples according to different initiators. Descriptions are made in embodiment 3 taking a broadband terminal as a single call initiator. Descriptions are made in embodiment 4 taking a narrowband terminal as a group call initiator.

Figure 4:
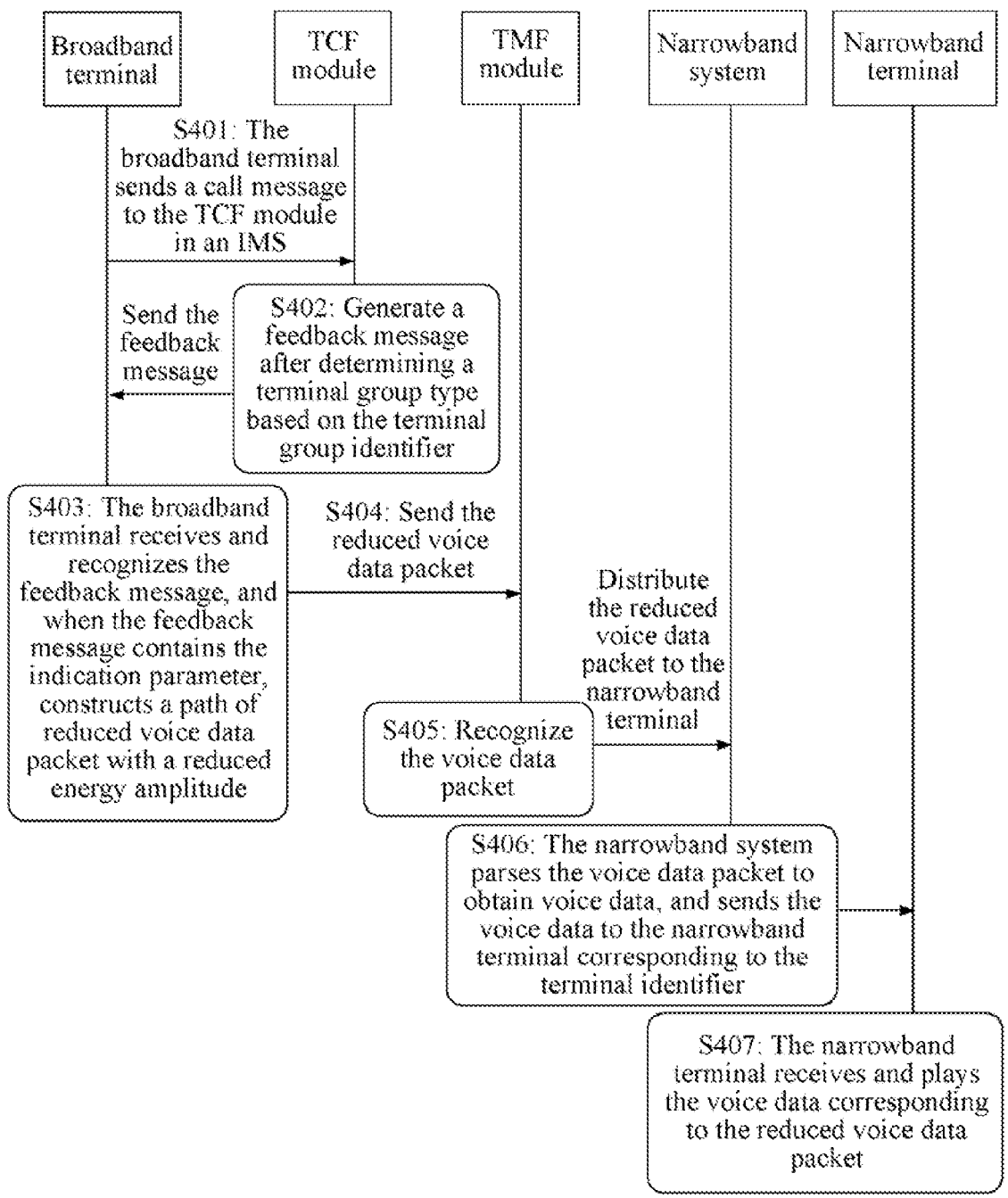
FIG. 4 is a schematic structural diagram of embodiment 3 of a voice communication method under a broadband and narrowband intercommunication environment according to one embodiment of the present application.

Referring to FIG. 4, embodiment 3 of a voice communication method under a broadband and narrowband intercommunication environment is illustrated. The following steps may be included.

In step S401, a broadband terminal sends a call message to a TCF module in an IMS, the call message including a single call type and a terminal identifier in case of a single call.

The broadband terminal has established a communication link with the IMS in advance. The broadband terminal may send a call message to the TCF module in the IMS when needing to initiating a single call.

The call message includes a single call type and a terminal identifier. The single call type may notify the TCF module that the current call is a single call. The terminal identifier may notify the TCF module of a terminal that the current single call is initiated to.

In step S402, the TCF module generates and sends a feedback message to the broadband terminal after determining a terminal type based on the terminal identifier, the feedback message containing an indication parameter indicating a narrowband terminal when the terminal type is narrowband terminal.

When the terminal type is narrowband terminal, the TCF module generates a feedback message, the feedback message indicating that the terminal type is narrowband terminal For example, a pdtcall parameter is added in the feedback message to indicate that the terminal type is narrowband terminal.

In step S403, the broadband terminal receives and recognizes the feedback message, and when the feedback message contains the indication parameter, constructs one path of reduced voice data packet with a reduced energy amplitude.

If the feedback message contains the indication parameter, it is confirmed that the terminal type is narrowband terminal. In order to avoid whistling at the narrowband terminal, the broadband terminal constructs one path of voice data packet. One path of voice data packet is a reduced voice data packet with a reduced energy amplitude, and is used to be sent to a narrowband terminal in the terminal group.

In order to construct one path of voice data packet, the broadband terminal enables one coder. Voice data is collected, a reducing process is executed on an energy amplitude of the voice data, and voice data with a reduced energy amplitude is sent to one path of coder. The coder adds a type field in a packet header, changes the type field in the packet header into a first numerical value, and generates the reduced voice data packet based on the packet header and the voice data.

It can be understood that a reducing factor determined by multiple tests is pre-stored in the broadband terminal, and the broadband terminal may execute a reducing operation on the energy amplitude according to the reducing factor, thereby obtaining the reduced voice data packet. Under normal circumstances, the normal energy amplitude approximately ranges from 14,000 to −24,000, and the reduced energy amplitude approximately ranges from 2,000 to −3,000.

For example, the type field is added in the packet header, and both the TMF module and the terminal determine whether the voice data packet is to be sent to the broadband terminal or the narrowband terminal according to the type field. If the type field is 0, it indicates that the voice data packet is to be forwarded to both the broadband terminal and the narrowband terminal. If the type field is 1, it indicates that the voice data packet is to be sent to the narrowband terminal. If the type field is 2, it indicates that the voice data packet is to be sent to the broadband terminal.

In step S404, the broadband terminal sends the reduced voice data packet to a TMF module in the IMS.

The TMF module in the IMS provides a port for the broadband terminal. The broadband terminal may send the voice data packet to one port of the TMF module.

In step S405, the TMF module recognizes the reduced voice data packet, and sends the reduced voice data packet to a narrowband system.

The TMF module recognizes the type field in the packet header of the reduced voice data packet. If the type field in the packet header of the reduced voice data packet is the first numerical value, the type field in the packet header of the voice data packet is deleted, and then the voice data packet is distributed to the narrowband system.

In order to avoid influences on the narrowband system, the voice data packet is sent to the narrowband system through a PDTGW after the type field in the packet header is deleted. The concept of RTP packet does not exist for a narrowband terminal, so the narrowband system may analyze the voice data packet to obtain the voice data, and send the voice data to the narrowband terminal in the terminal group.

In step S406, the narrowband system analyzes the voice data packet to obtain voice data, and sends the voice data to the narrowband terminal corresponding to the terminal identifier.

The narrowband system, after analyzing the voice data packet to obtain voice data, sends the voice data to the narrowband terminal.

In step S407, the narrowband terminal receives and plays the voice data corresponding to the reduced voice data packet.

Through the technical features in embodiment 3, the following beneficial effects may be achieved.

In order to solve the problem of whistling occurring in a narrowband terminal when a broadband terminal calls the narrowband terminal, when the broadband terminal calls the narrowband terminal, the broadband terminal executes a reducing operation on an energy amplitude of voice data to obtain a reduced voice data packet, and sends the reduced voice data packet to the narrowband terminal such that the narrowband terminal plays the reduced voice data packet. As such, whistling at the narrowband terminal is avoided.

Figure 5:
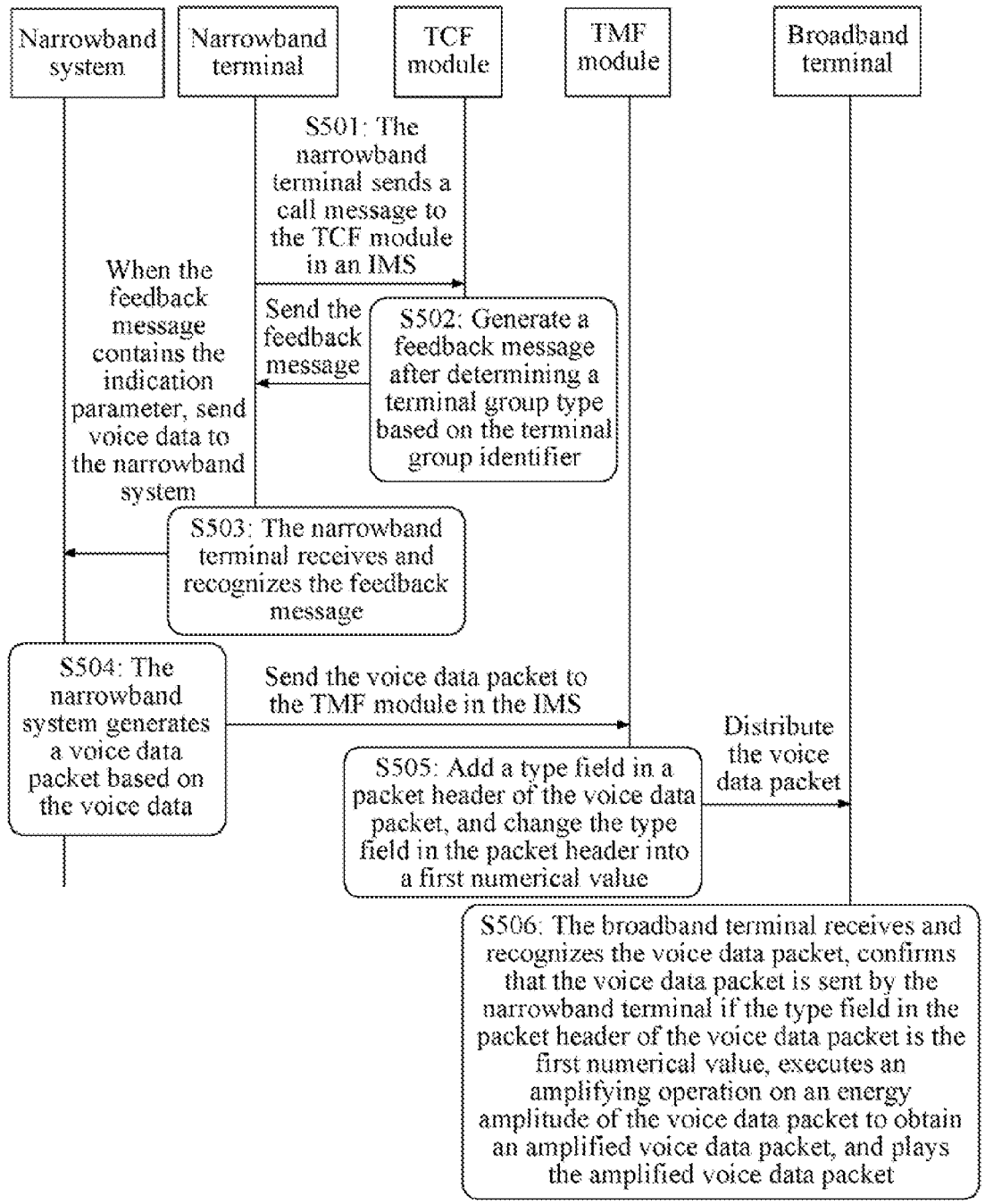
FIG. 5 is a schematic structural diagram of embodiment 4 of a voice communication method under a broadband and narrowband intercommunication environment according to one embodiment of the present application.

Referring to FIG. 5, embodiment 4 of a voice communication method under a broadband and narrowband intercommunication environment is illustrated. The following steps may be included.

In step S501, a narrowband terminal sends a call message to a TCF module in an IMS, the call message including a single call type and a terminal identifier in case of a single call.

In step S502, the TCF module generates and sends a feedback message to the narrowband terminal after determining a terminal type based on the terminal identifier, where when the terminal type is a narrowband terminal, the feedback message contains an indication parameter indicating the narrowband terminal.

In step S503, the narrowband terminal receives and recognizes the feedback message, and when the feedback message contains the indication parameter, sends voice data to a narrowband system.

In step S504, the narrowband system generates a voice data packet, and sends, through a gateway, the voice data packet to a TMF module in the IMS.

In step S505, the TMF module adds a type field in a packet header of the voice data packet, changes the type field in the packet header into a first numerical value, and distributes the voice data packet to the broadband terminal corresponding to the terminal identifier.

The voice data packet transmitted by the narrowband system through a gateway does not contain any type field. Therefore, for facilitating the processing of the TMF module, the TMF module, when recognizing that the voice data packet is transmitted from a narrowband port, adds a type field for the voice data packet, and changes the type field in a packet header into a first numerical value to indicate that the voice data packet is from the narrowband terminal.

In step S506, the broadband terminal receives and recognizes the voice data packet, confirms that the voice data packet is sent by the narrowband terminal if the type field in the packet header of the voice data packet is the first numerical value, executes an amplifying operation on an energy amplitude of the voice data packet to obtain an amplified voice data packet, and plays the amplified voice data packet.

In order to solve the problem of relatively low volume if the voice data packet is played directly, the broadband terminal, after recognizing the voice data packet sent by the narrowband terminal, executes an amplifying operation on an energy amplitude of the voice data packet, and plays an amplified voice data packet. As such, the problem of relatively low volume at a broadband terminal side when a narrowband terminal calls a broadband terminal is solved.

It can be understood that an amplification factor determined by multiple tests is pre-stored in the broadband terminal, and the broadband terminal may execute the amplifying operation on the energy amplitude according to the amplification factor, thereby obtaining the amplified voice data packet.

It can be seen from the above steps that the present example has the following beneficial effects.

In order to solve the problem of relatively low volume of a voice played by a broadband terminal when a narrowband terminal calls the broadband terminal, when the narrowband terminal calls the broadband terminal, the broadband terminal receives a voice data packet, executes an amplifying operation on an energy amplitude of the voice data packet to obtain an amplified voice data packet, and plays the amplified voice data packet. As such, the problem of relatively low volume of a voice played by the broadband terminal is solved.

The functions of the method embodiments, if implemented in the form of software functional units and sold or used as an independent product, may also be stored in a readable storage medium of a computing device. Based on such an understanding, the part of the embodiments of the present application contributing to the prior art, or some of the technical solutions may be implemented in a form of a software product. The software product is stored in a storage medium, and includes several instructions for instructing a computing device (which may be a personal computer, a server, a mobile computing device, or a network device) to perform all or some of the steps of the methods described in the embodiments of the present application. The foregoing storage medium includes: various media capable of storing program codes such as a U disk, a mobile hard disk, a Read-Only Memory (ROM), a Random Access Memory (RAM), a magnetic disk, or an optical disk.

The embodiments in this specification are all described in a progressive manner, for same or similar parts in the embodiments, refer to these embodiments, and each embodiment focuses on a difference from other embodiments.

The foregoing description of the disclosed embodiments enables a person skilled in the art to implement or use the present application. It is apparent to a person skilled in the art to make various changes to these embodiments. The general concept defined in the specification may be implemented in other embodiments without departing from the spirit and scope of the present application. Therefore, the present application is not limited to these embodiments shown in the specification, and instead is to meet the widest range consistent with the principles and novel features disclosed in the specification.

What is claimed is:

1. A voice communication method under a broadband and narrowband intercommunication environment, comprising:
when a broadband terminal calls a narrowband terminal, executing a reducing operation on an energy amplitude of voice data to obtain a reduced voice data packet, and sending the reduced voice data packet to the narrowband terminal for the narrowband terminal to play the reduced voice data packet, by the broadband terminal; and
when the narrowband terminal calls the broadband terminal, receiving a voice data packet, executing an amplifying operation on an energy amplitude of the voice data packet to obtain an amplified voice data packet, and playing the amplified voice data packet, by the broadband terminal,
wherein the call comprises a group call or a single call,
when the call is the group call, collecting the voice data to generate a normal voice data packet, and sending the normal voice data packet to other broadband terminals in the group call, by the broadband terminal; and
wherein said executing the reducing operation on the energy amplitude of the voice data to obtain the reduced voice data packet by the broadband terminal comprises: collecting the voice data, executing a reducing process on the energy amplitude of the voice data, and sending the voice data with the reduced energy amplitude to one coder, so that the coder adds a type field in a packet header, changes the type field in the packet header into a first numerical value, and generates the reduced voice data packet based on the packet header and the voice data; and
wherein said collecting the voice data to generate the normal voice data packet by the broadband terminal comprises: collecting the voice data, sending the voice data to another coder, adding a type field in a packet header, changing the type field in the packet header into a second numerical value, and generating the normal voice data packet based on the packet header and the voice data.

2. A voice communication method under a broadband and narrowband intercommunication environment, wherein the method is applied to a voice communication system under a broadband and narrowband intercommunication environment, wherein the system includes: a broadband terminal, a broadband system, a narrowband terminal, a narrowband system, and an internet protocol (IP) multimedia subsystem (IMS), and the method comprises:
when the broadband terminal calls the narrowband terminal, the broadband terminal executes a reducing operation on an energy amplitude of voice data to obtain a reduced voice data packet, and after processing sequentially by the broadband system, the IMS, and the narrowband system, sends the reduced voice data packet to the narrowband terminal for the narrowband terminal to play the reduced voice data packet; and
when the narrowband terminal calls the broadband terminal, the broadband terminal receives a voice data packet after processing sequentially by the narrowband system, the IMS, and the broadband system, executes an amplifying operation on an energy amplitude of the voice data packet to obtain an amplified voice data packet, and plays the amplified voice data packet,
wherein the call comprises a group call or a single call,
when the call is the group call, the broadband terminal collects the voice data to generate a normal voice data packet, and after processing sequentially by the broadband system, the Internet Protocol Multimedia Subsystem, sends the normal voice data packet to other broadband terminals in the group call,
wherein said executing the reducing operation on the energy amplitude of the voice data to obtain the reduced voice data packet by the broadband terminal comprises: collecting the voice data, executing a reducing process on the energy amplitude of the voice data, and sending the voice data with the reduced energy amplitude to one coder, so that the coder adds a type field in a packet header, changes the type field in the packet header into a first numerical value, and generates the reduced voice data packet based on the packet header and the voice data; and
wherein said collecting the voice data to generate the normal voice data packet by the broadband terminal includes: collecting the voice data, sending the voice data to another coder, adding a type field in a packet header, changing the type field in the packet header into a second numerical value, and generating the normal voice data packet based on the packet header and the voice data.

3. A voice communication method under a broadband and narrowband intercommunication environment, wherein the method is applied to a voice communication system under a broadband and narrowband intercommunication environment, wherein the system includes: a broadband terminal, a broadband system, a narrowband terminal, a narrowband system, and an internet protocol (IP) multimedia subsystem (IMS), and the method comprises:
when the broadband terminal calls the narrowband terminal, the broadband terminal executes a reducing operation on an energy amplitude of voice data to obtain a reduced voice data packet, and after processing sequentially by the broadband system, the IMS, and the narrowband system, sends the reduced voice data packet to the narrowband terminal for the narrowband terminal to play the reduced voice data packet;

when the narrowband terminal calls the broadband terminal, the broadband terminal receives a voice data packet after processing sequentially by the narrowband system, the IMS, and the broadband system, executes an amplifying operation on an energy amplitude of the voice data packet to obtain an amplified voice data packet, and plays the amplified voice data packet;

sending, by the broadband terminal, a call message to a Trunking Control Function (TCF) module in an Internet Protocol (IP) Multimedia Subsystem (IMS), the call message comprising a group call type and a terminal group identifier in case of a group call;

generating and sending, by the TCF module, a feedback message to the broadband terminal after determining a terminal group type based on the terminal group identifier, wherein when the terminal group type is a mixed group comprising both a broadband terminal and a narrowband terminal, the feedback message contains an indication parameter indicating the mixed group;

receiving and recognizing, by the broadband terminal, the feedback message, constructing two paths of voice data packets when the feedback message contains the indication parameter, and sending the two paths of voice data packets alternately to a Trunking Media Function (TMF) module in the IMS, one path of voice data packet being a reduced voice data packet with a reduced energy amplitude, while the other path of voice data packet being a normal voice data packet with a normal energy amplitude; and recognizing, by the TMF module, the two paths of voice data packets, distributing the reduced voice data packet to a narrowband terminal in the terminal group, and distributing the normal voice data packet to other broadband terminals in the terminal group.

4. The method according to claim 3, wherein the constructing two paths of voice data packets comprises:

collecting, by the broadband terminal, voice data, and enabling two coders;

executing a reducing process on an energy amplitude of the voice data, sending voice data with a reduced energy amplitude to one path of coder, adding a type field in a packet header, changing the type field in the packet header into a first numerical value, and generating the reduced voice data packet based on the packet header and the voice data; and sending the voice data to the other path of coder, adding a type field in a packet header, changing the type field in the packet header into a second numerical value, and generating the normal voice data packet based on the packet header and the voice data.

5. The method according to claim 4, wherein the recognizing, by the TMF module, the two paths of voice data packets and distributing the reduced voice data packet to a narrowband terminal in the terminal group comprises:

recognizing, by the TMF module, the packet headers of the two paths of voice data packets;

deleting, if the type field in the packet header of one path of voice data packet is the first numerical value, the type field in the packet header of the voice data packet, and then distributing the voice data packet to a narrowband system; and after recognizing the voice data packet to obtain the voice data, sending, by the narrowband system, the voice data to the narrowband terminal in the terminal group.

6. The method according to claim 4, wherein after the distributing the normal voice data packet to other broadband terminals in the terminal group, the method further comprises:

receiving and recognizing, by the other broadband terminals, the normal voice data packet; and confirming, after recognizing that the type field in the packet header of the normal voice data packet is the second numerical value, that the voice data packet is sent by the broadband terminal, and directly playing the normal voice data packet.

7. A voice communication method under a broadband and narrowband intercommunication environment, wherein the method is applied to a voice communication system under a broadband and narrowband intercommunication environment, wherein the system includes: a broadband terminal, a broadband system, a narrowband terminal, a narrowband system, and an internet protocol (IP) multimedia subsystem (IMS), and the method comprises:

when the broadband terminal calls the narrowband terminal, the broadband terminal executes a reducing operation on an energy amplitude of voice data to obtain a reduced voice data packet, and after processing sequentially by the broadband system, the IMS, and the narrowband system, sends the reduced voice data packet to the narrowband terminal for the narrowband terminal to play the reduced voice data packet;

when the narrowband terminal calls the broadband terminal, the broadband terminal receives a voice data packet after processing sequentially by the narrowband system, the IMS, and the broadband system, executes an amplifying operation on an energy amplitude of the voice data packet to obtain an amplified voice data packet, and plays the amplified voice data packet;

sending, by the narrowband terminal, a call message to a Trunking Control Function (TCF) module in an Internet Protocol (IP) Multimedia Subsystem (IMS), the call message comprising a group call type and a terminal group identifier in case of a group call;

generating and sending, by the TCF module, a feedback message to the narrowband terminal after determining a terminal group type based on the terminal group identifier, wherein when the terminal group type is a mixed group comprising both a broadband terminal and a narrowband terminal, the feedback message contains an indication parameter indicating the mixed group;

receiving and recognizing, by the narrowband terminal, the feedback message, and when the feedback message contains the indication parameter, sending voice data to a narrowband system such that the narrowband system generates a voice data packet and sends, through a gateway, the voice data packet to a Trunking Media Function (TMF) module in the IMS;

adding, by the TMF module, a type field in a packet header of the voice data packet, changing the type field in the packet header into a first numerical value, and distributing the voice data packet to a broadband terminal and other narrowband terminals in the terminal group; and receiving and recognizing, by the broadband terminal in the terminal group, the voice data packet, confirming that the voice data packet is sent by the narrowband terminal if the type field in the packet header of the voice data packet is the first numerical value, executing an amplifying operation on an energy amplitude of the voice data packet to obtain an amplified voice data packet, and playing the amplified voice data packet.

8. The method according to claim 7, wherein the distributing the voice data packet to a broadband terminal and other narrowband terminals in the terminal group comprises:
   recognizing, by the TMF module, the packet header of the voice data packet; and
   deleting, if the type field in the packet header of the voice data packet is the first numerical value, the type field in the packet header of the voice data packet, and then distributing the voice data packet to the narrowband system.

9. A voice communication method under a broadband and narrowband intercommunication environment, wherein the method is applied to a voice communication system under a broadband and narrowband intercommunication environment, wherein the system includes: a broadband terminal, a broadband system, a narrowband terminal, a narrowband system, and an internet protocol (IP) multimedia subsystem (IMS), and the method comprises:
   when the broadband terminal calls the narrowband terminal, the broadband terminal executes a reducing operation on an energy amplitude of voice data to obtain a reduced voice data packet, and after processing sequentially by the broadband system, the IMS, and the narrowband system, sends the reduced voice data packet to the narrowband terminal for the narrowband terminal to play the reduced voice data packet;
   when the narrowband terminal calls the broadband terminal, the broadband terminal receives a voice data packet after processing sequentially by the narrowband system, the IMS, and the broadband system, executes an amplifying operation on an energy amplitude of the voice data packet to obtain an amplified voice data packet, and plays the amplified voice data packet;
   sending, by the broadband terminal, a call message to a Trunking Control Function (TCF) module in an Internet Protocol (IP) Multimedia Subsystem (IMS), the call message comprising a single call type and a terminal identifier in case of a single call;
   generating and sending, by the TCF module, a feedback message to the broadband terminal after determining a terminal type based on the terminal identifier, wherein when the terminal type is a narrowband terminal, the feedback message contains an indication parameter indicating the narrowband terminal;
   receiving and recognizing, by the broadband terminal, the feedback message of the TCF module, constructing one path of reduced voice data packet with a reduced energy amplitude when the feedback message contains the indication parameter, and sending the reduced voice data packet to a TMF module in the IMS; and
   recognizing, by the TMF module, the reduced voice data packet, and sending the reduced voice data packet to the narrowband terminal corresponding to the terminal identifier.

10. A voice communication method under a broadband and narrowband intercommunication environment, wherein the method is applied to a voice communication system under a broadband and narrowband intercommunication environment, wherein the system includes: a broadband terminal, a broadband system, a narrowband terminal, a narrowband system, and an internet protocol (IP) multimedia subsystem (IMS), and the method comprises:
   when the broadband terminal calls the narrowband terminal, the broadband terminal executes a reducing operation on an energy amplitude of voice data to obtain a reduced voice data packet, and after processing sequentially by the broadband system, the IMS, and the narrowband system, sends the reduced voice data packet to the narrowband terminal for the narrowband terminal to play the reduced voice data packet;
   when the narrowband terminal calls the broadband terminal, the broadband terminal receives a voice data packet after processing sequentially by the narrowband system, the IMS, and the broadband system, executes an amplifying operation on an energy amplitude of the voice data packet to obtain an amplified voice data packet, and plays the amplified voice data packet;
   sending, by the narrowband terminal, a call message to a Trunking Control Function (TCF) module in an Internet Protocol (IP) Multimedia Subsystem (IMS), the call message comprising a single call type and a terminal identifier in case of a single call;
   generating and sending, by the TCF module, a feedback message to the narrowband terminal after determining a terminal type based on the terminal identifier, wherein when the terminal type is a broadband terminal, the feedback message contains an indication parameter indicating the broadband terminal;
   receiving and recognizing, by the narrowband terminal, the feedback message, and when the feedback message contains the indication parameter, sending voice data to a narrowband system such that the narrowband system generates a voice data packet and sends, through a gateway, the voice data packet to a Trunking Media Function (TMF) module in the IMS;
   adding, by the TMF module, a type field in a packet header of the voice data packet, changing the type field in the packet header into a first numerical value, and distributing the voice data packet to the broadband terminal corresponding to the terminal identifier; and
   receiving and recognizing, by the broadband terminal, the voice data packet, confirming that the voice data packet is sent by the narrowband terminal if the type field in the packet header of the voice data packet is the first numerical value, executing an amplifying operation on an energy amplitude of the voice data packet to obtain an amplified voice data packet, and playing the amplified voice data packet.

11. A terminal, wherein the terminal as a broadband terminal, and the broadband terminal comprises:
   a processor, and a memory storing instructions for execution by the processor, when executed, the instructions cause the broadband terminal to perform operations including:
   when a broadband terminal calls a narrowband terminal, executing a reducing operation on an energy amplitude of voice data to obtain a reduced voice data packet, and sending the reduced voice data packet to the narrowband terminal for the narrowband terminal to play the reduced voice data packet, by the broadband terminal; and
   when the narrowband terminal calls the broadband terminal, receiving a voice data packet, executing an amplifying operation on an energy amplitude of the voice data packet to obtain an amplified voice data packet, and playing the amplified voice data packet, by the broadband terminal,
   wherein the call comprises a group call or a single call,
   when the call is the group call, collecting the voice data to generate a normal voice data packet, and sending the normal voice data packet to other broadband terminals in the group call, by the broadband terminal,
   wherein said executing the reducing operation on the energy amplitude of the voice data to obtain the reduced voice data packet by the broadband terminal comprises: collecting the voice data, executing a reducing process on the energy amplitude of the voice data, and sending the voice data with the reduced energy amplitude to one coder, so that the coder adds a type field in a packet header, changes the type field in the packet header into a first numerical value, and generates the reduced voice data packet based on the packet header and the voice data; and wherein said collecting the voice data to generate the normal voice data packet by the broadband terminal includes: collecting the voice data, sending the voice data to another coder, adding a type field in a packet header, changing the type field in the packet header into a second numerical value, and generating the normal voice data packet based on the packet header and the voice data.

12. A voice communication system under a broadband and narrowband intercommunication environment, comprising:

a broadband terminal, a broadband system, a narrowband terminal, a narrowband system, and Internet Protocol (IP) Multimedia Subsystem (IMS), when the broadband terminal calls the narrowband terminal, the broadband terminal executes a reducing operation on an energy amplitude of voice data to obtain a reduced voice data packet, and after processing sequentially by the broadband system, the Internet Protocol Multimedia Subsystem, and the narrowband system, sends the reduced voice data packet to the narrowband terminal for the narrowband terminal to play the reduced voice data packet; and when the narrowband terminal calls the broadband terminal, the broadband terminal receives a voice data packet after processing sequentially by the narrowband system, the IMS, and the broadband system, executes an amplifying operation on an energy amplitude of the voice data packet to obtain an amplified voice data packet, and plays the amplified voice data packet, wherein the call comprises a group call or a single call, when the call is the group call, the broadband terminal collects the voice data to generate a normal voice data packet, and after processing sequentially by the broadband system, the Internet Protocol Multimedia Subsystem, sends the normal voice data packet to other broadband terminals in the group call, wherein said executing the reducing operation on the energy amplitude of the voice data to obtain the reduced voice data packet by the broadband terminal comprises: collecting the voice data, executing a reducing process on the energy amplitude of the voice data, and sending the voice data with the reduced energy amplitude to one coder, so that the coder adds a type field in a packet header, changes the type field in the packet header into a first numerical value, and generates the reduced voice data packet based on the packet header and the voice data; and wherein said collecting the voice data to generate the normal voice data packet by the broadband terminal includes: collecting the voice data, sending the voice data to another coder, adding a type field in a packet header, changing the type field in the packet header into a second numerical value, and generating the normal voice data packet based on the packet header and the voice data.

* * * * *